United States Patent [19]

Cohen et al.

[11] 4,299,093

[45] Nov. 10, 1981

[54] ABSORBERS USED IN ABSORPTION HEAT PUMPS AND REFRIGERATORS

[75] Inventors: Georges Cohen, Le Pecq; Alexandre Rojey, Garches, both of France

[73] Assignee: Institut Francais du Petrole, Rueil-Malmaison, France

[21] Appl. No.: 79,730

[22] Filed: Sep. 28, 1979

[30] Foreign Application Priority Data

Sep. 28, 1978 [FR] France .............................. 78 28170

[51] Int. Cl.³ ............................................ F25B 15/00
[52] U.S. Cl. ..................................... 62/101; 62/476; 62/489; 62/494
[58] Field of Search ................ 62/101, 106, 489, 494, 62/476

[56] References Cited

U.S. PATENT DOCUMENTS

| 2,182,453 | 12/1939 | Sellew | 62/79 |
| 2,237,302 | 4/1941 | Flukes | 62/101 X |
| 3,314,246 | 4/1967 | Hopkins et al. | 62/494 X |
| 3,390,544 | 7/1968 | Eberz | 62/494 X |
| 3,410,104 | 11/1968 | Hopkins | 62/489 X |
| 3,426,548 | 2/1969 | Greacen et al. | 62/101 |

Primary Examiner—Lloyd L. King
Attorney, Agent, or Firm—Millen & White

[57] ABSTRACT

A solvent phase of low solute content is contacted with a solute gas phase for absorption of the solute; effluent gas is condensed in admixture with a portion of the solvent phase which has not been fed to the absorption zone. Overall thermal yield is increased.

14 Claims, 5 Drawing Figures

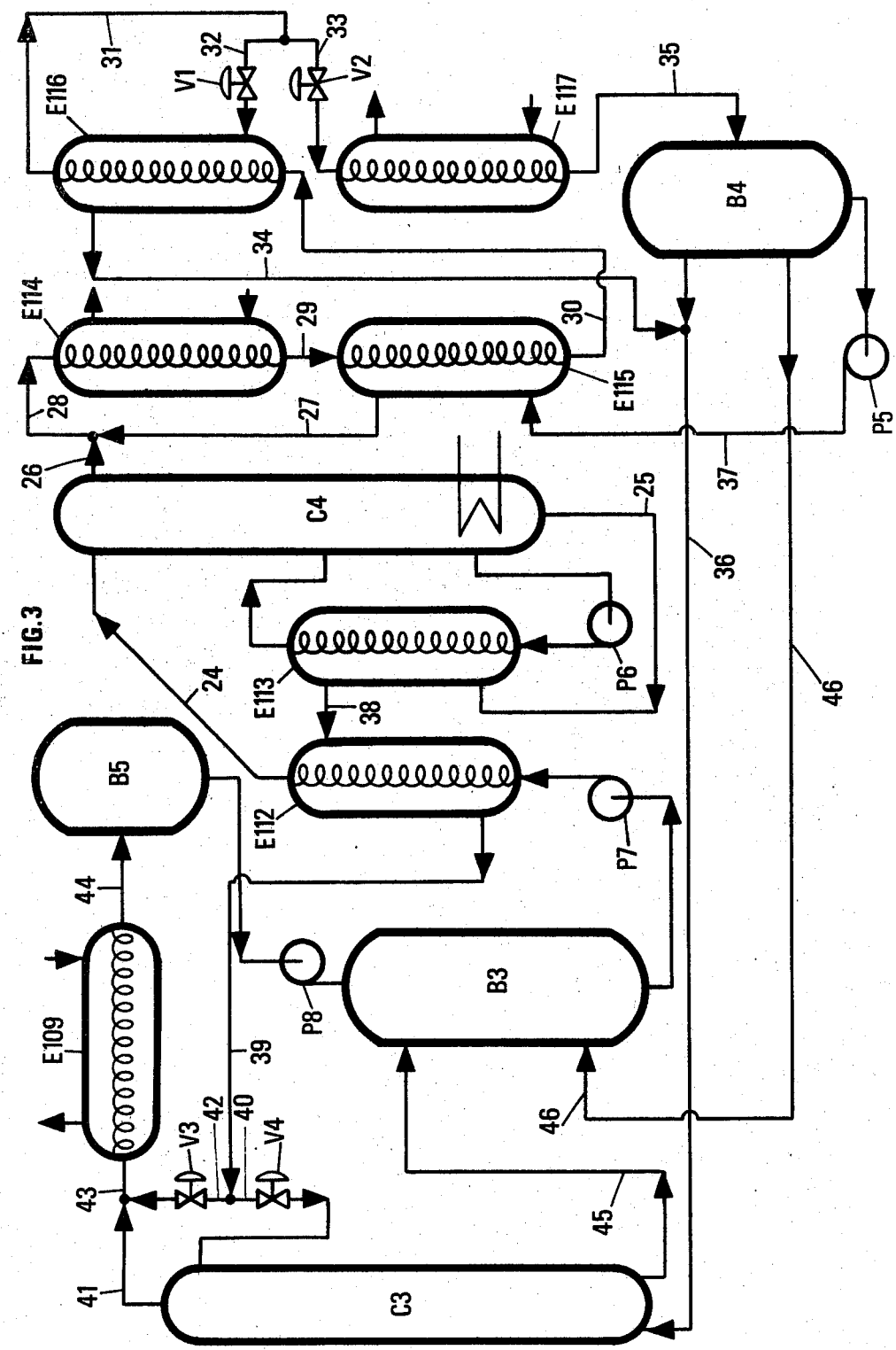

ABSORBERS USED IN ABSORPTION HEAT PUMPS AND REFRIGERATORS

BACKGROUND OF THE INVENTION

This invention concerns an improvement to heat pumps and refrigerators of the absorption type. As known, such systems basically operate by supplying heat to an external fluid A while receiving heat from an external fluid B and exchanging heat with an external fluid C. The two cases are to be distinguished. In the first case (called case 1), the thermal level of fluid B is higher than the thermal level of fluid A and the system receives heat from the fluid C which is at a lower thermal level than the fluids A and B. If fluid C is at a thermal level higher than room temperature, the device operated according to such a cycle is usually referred to as an absorption heat pump. In that case, there is transferred to fluid A a heat amount $Q_2$ higher than the heat amount $Q_1$ which is transferred from fluid B, and a heat amount $Q_2-Q_1$ is received from fluid C. The fluid C may be at a thermal level lower than room temperature; in that case, the device operates as a refrigerator. In the second case (called case 2), the thermal level of fluid B is lower than the thermal level of fluid A and the system supplies heat to fluid C which is at a lower thermal level than fluids A and B: this is a heat converter such as is disclosed in French Pat. No. 2,321,098 (EN No. 7,525,598). In that case, fluid A receives a heat amount $Q_2$ lower than the heat amount $Q_1$ which is released by fluid B, and a heat amount $Q_2-Q_1$ is supplied to fluid C.

In the description of the present invention, any device receiving heat only above room temperature and complying with the above general definition, either in case 1 or in case 2, is designated as an absorption heat pump.

In the above general description of the prior art, and in the following disclosure, temperature or thermal level is intended to designate more or less wide temperature ranges which may be also a substantially constant temperature in the case of a change of state of the external fluid with which the heat exchange is effected. A first "thermal level" is considered as higher than a second "thermal level" if the corresponding temperature range is at least partly above the temperature range of the second "thermal level".

In the two cases described above, the cycle comprises at least one absorption step in which a gas phase of a working fluid (the solute) is contacted with a liquid phase (the solvent), and a desorption step which yield a liquid phase of lower solute content and a gas phase of high solute content. Therefore, the solute is a material which may appear either as a gas or in the dissolved state.

The absorption step is usually effected in one contact step; the liquid solvent phase (L) and the gas solute phase (V) are fed to an enclosure and a solution (S) is obtained, while the absorption heat is discharged by indirect contact exchange in the absorber, as disclosed in FIG. 1A.

It is also known to effect the absorption step by counter-current contact of the liquid phase with the vapor phase. This system is disclosed, for example, in the French Pat. No. 2,321,098. In that case, it is possible to operate according to the arrangement shown in FIG. 1B. The counter-current contact is effected in adiabatic conditions, for example in a column, and the discharge of heat to the environment is effected at least partly by condensation, outside the column, of the vapor obtained at the top. In the contact column, the absorption heat results in the vaporization of a fraction of the solvent phase which is less volatile, and there is collected, at the top of the column, a vapor fraction of higher solvent vapor content, which fraction is condensed in exchanger (W) while supplying heat to fluid A.

Adiabatic conditions are conditions in which, as a result of the limitation or even absence of heat exchange with the environment, any released heat is recovered, at least in part, in the fluids discharged from the zone subjected to these conditions.

If the solvent phase fed to the column is in the pure state, it is possible to collect, at the top of the column, a vapor fraction of low solute content and high solvent content, and to thus obtain, at the top of the column, a temperature higher than at the bottom, also higher than the temperature which is attained in one single contact stage.

This arrangement has also some disadvantages. In fact, the condensation range for the top vapor depends on its content of solute; therefore, to avoid that the final condensation temperature be far lower than the initial condensation temperature, it is necessary to allow only a low proportion of solute in the top vapor and therefore the solvent phase must be totally purified in the desorption step.

This problem is made apparent when considering ammonia absorption in aqueous phase in the case where the vapor is discharged in a practically balanced proportion to the solvent phase (L) supplied to the column, which occurs when the vapor feed rate is low as compared to the liquid feed rate. The following results are obtained when varying the composition of the solvent phase (L) at a pressure of 10.2 atm.

TABLE 1

| $NH_3$ molar fraction in the solvent phase | $NH_3$ molar fraction in the vapor phase | Heat of condensation cal/mole | Initial condensation temperature °C. | Final condensation temperature °C. | Condensation Range °C. |
|---|---|---|---|---|---|
| 0.01 | 0.065 | 8735 | 178 | 162 | 16 |
| 0.04 | 0.242 | 8933 | 169 | 118 | 51 |
| 0.10 | 0.512 | 8740 | 153 | 64 | 89 |

It is apparent that the condensation range widens very quickly. To avoid this it is necessary to thoroughly purify the solvent phase in the desorption step and to limit the feed rate of the vapor fraction fed to the column. These requirements limit the yield.

SUMMARY OF THE INVENTION

It is therefore an object of the present invention, to operate according to an arrangement which retains the advantage of a high initial condensation temperature, while narrowing the condensation range, and accordingly, to obtain a higher yield for given temperature conditions. This yield improvement concerns either the ratio of the heat amount received from fluid C to the heat amount received from fluid B (case 1), or the ratio of the heat amount supplied to fluid A to the heat amount received from fluid B (case 2).

BRIEF DESCRIPTION OF THE DRAWINGS

FIG. 3 is a schematic diagram of another embodiment of the present invention.

Figure 1A:
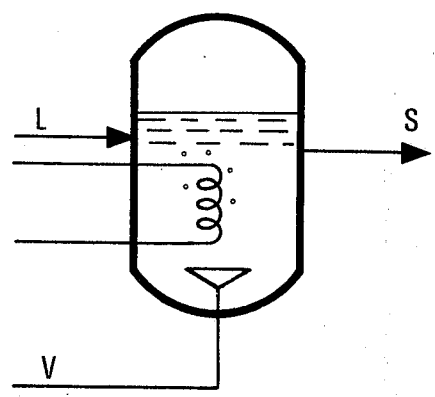
FIG. 1A is a schematic diagram of an indirect contact heat exchange absorber.
Figure 1B:
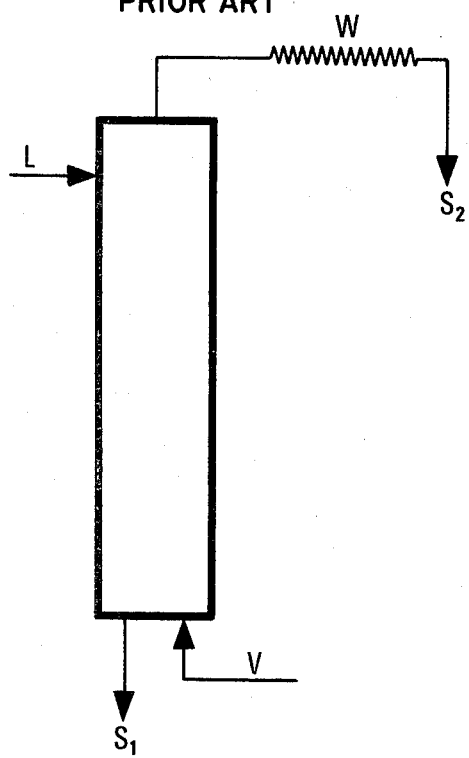
FIG. 1B is a schematic diagram of an absorber for effecting countercurrent contact of a liquid phase with a vapor phase.
Figure 1C:
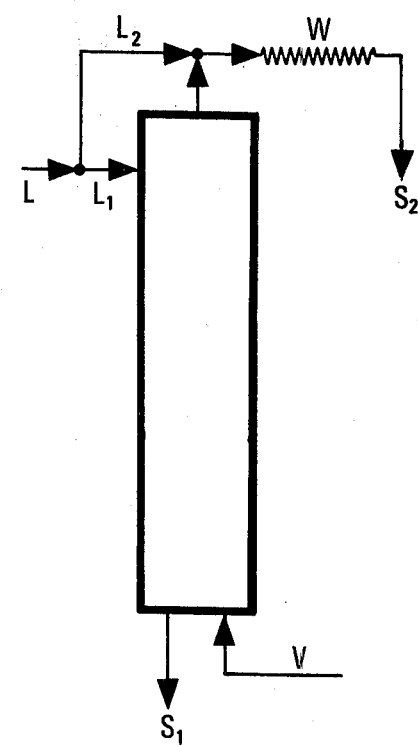
FIG. 1C is a schematic diagram of an improved heat absorber for use in the present invention.

The improvement to the absorption step of the absorption heat pumps and refrigerators, according to the present invention, as illustrated by FIG. 1C, comprises supplying a portion ($L_1$) of the solvent phase (L) to the absorption zone, the other portion ($L_2$) being joined to the vapor phase which is discharged from the absorption zone, of reduced solute content and which contains a substantial amount of solvent vapor, before passage or during passage of this vapor phase through the exchanger W where it releases heat (mainly condensation heat) to an external fluid A. There is thus obtained an impoverished solution $S_1$ and a solution $S_2$ resulting from the vapor condensation. The contact between the phases in the absorption zone is preferably effected counter-currently in view of the above-described advantages.

When operating in the above conditions with a water-ammonia mixture, at a pressure of 10.2 atm., with a solvent phase containing 10% ammonia as molar fraction and a vapor phase containing 51.2% ammonia as molar fraction, while varying the molar ratio $L_2/V_S$, where $V_S$ is the molar vapor feed rate at the outlet and $L_2$ is the molar feed rate of the solvent phase admixed with the vapor, the ammonia content of the mixture and the temperature at the end of the condensation vary as follows:

| $L_2/V_S$ | 0 | 0.5 | 1 | 2 |
|---|---|---|---|---|
| % molar ammonia content | 51.2 | 37.4 | 30.6 | 23.7 |
| Final condensation temperature °C. | 64 | 90 | 100 | 119 |

Conversely, it is important not to exceed the value of the $L_2/V_S$ ratio required for obtaining a given final condensation temperature, where it is desired to admit a high ammonia feed rate in the absorption zone, in order to produce the highest possible heat amount.

The modification of the absorption and heat exchange step, as described above, does not change the other steps of the process, as described in the prior art, in particular the steps of desorption and heat exchange with the fluids B and C. Thus, the two solutions ($S_1$) and ($S_2$) may be supplied to a desorption zone where the solvent phase (L) and the vapor phase (V) are regenerated according to known techniques, while exchanging heat with the fluids B and C.

The modified absorption step, as described above, may be inserted into any absorption heat pump or refrigerator.

The essential steps of the process are preferably as follows:
(a) a gas phase, being the solute, is counter-currently contacted in an absorption zone with a first liquid fraction ($L_1$) of the solvent phase, and there are obtained a solution $S_1$ of increased solute content and a gas phase of decreased solute content, (b) the gas phase, after contact with the first liquid fraction, is withdrawn from at least one point of said contact zone, (c) said gas phase is admixed with a second liquid fraction ($L_2$) of the solvent phase, (d) the mixture obtained in step (c) is cooled by heat exchange with an external fluid A, so as to condense at least partly said mixture while supplying heat to the fluid A and obtaining a solution $S_2$, (e) a liquid solvent phase and a gas solute phase are separated by desorption from the solutions $S_1$ and $S_2$ obtained in steps (a) and (d), while receiving heat from an external fluid B and exchanging heat with an external fluid C, and (f) the liquid solvent phase and the gas solute phase are recycled to step (a).

Step (e) may be performed according to any known technique. Two particular embodiments of desorption, which apply to the two above-described cases, are indicated below.

In case 1, the solution obtained at the outlet from the absorption zone, is desorbed in a desorption zone at a pressure which is least equal to the pressure of the absorption zone with heat supplied from the external fluid B in a temperature range above the temperature range in which heat is produced in the absorption zone. There is thereby obtained an impoverished solution, which is recycled to the absorption zone, and a vapor fraction which is at least partly condensed, while heat is supplied to the external fluid A, which is at least partly re-vaporized at a pressure close to the pressure of the absorption zone, while receiving heat from the external fluid C, and is then recycled to the absorption zone.

In case 2, the solution obtained at the outlet from the absorption zone is desorbed in a desorption zone at a pressure which is at most equal to the pressure of the absorption zone, while receiving heat from the external fluid B in a temperature range below the temperature range in which heat is produced in the absorption zone. There is thereby obtained an impoverished solution, which is recycled to the absorption zone, and a vapor fraction which is at least partially condensed, while heat is supplied heat to the external cooling fluid C, which is at least partly re-vaporized at a pressure close to the pressure of the absorption zone, while receiving heat from the external fluid B, and recycled to the absorption zone.

It is clear that each of the above heat exchanges may be conducted in one or more steps, the fluids A, B and C each designating either a single fluid or several fluids exchanging heat within a temperature range.

The solution obtained in step (d) may be either fed directly to the desorption zone or fed back to a point of the absorption zone to effect additional ammonia absorption.

The invention applies particularly when the solute is ammonia and the solvent is water. However, other solutes and other solvents may be used in the pure state or as mixtures.

The solvent may also be an organic solvent, such as dimethylformamide, dimethylsulfoxide, N-methyl pyrrolidone, tributylphosphate, ethylene glycol, diethylene glycol, benzyl alcohol, aniline or a hydrocarbon selected, for example, from the paraffinic hydrocarbons.

The solute (whose boiling or sublimation temperature is lower than that of the solvent) may be, in addition to ammonia, a hydrocarbon such as propane, butane, pentane or a chlorinated or fluorinated hydrocarbon such as difluorochloromethane, fluorodichloromethane or difluorodichloromethane, provided it is soluble in the solvent and the dissolution takes place with heat release.

As a rule, any solute-solvent pair may be used, provided the materials are chemically stable in the operating temperature and pressure conditions, the solute and the solvent may vaporize either pure or in admixture in the operating temperature and pressure conditions, the solute being however, more volatile than the solvent, and the solute may dissolve into the solvent with a resulting heat release.

The pressure in the absorption zone is preferably from 1 to 50 bars. Heat is usually produced, in the absorption zone, in a temperature range of from 20° to 150° C.

The fraction ($L_2$) of the solvent phase amounts usefully between 5-90% of the total solvent phase (L), preferably 5-60% of the solvent phase (L), the remainder forming the phase ($L_1$).

In the above described cases, the absorption and desorption steps are preferably effected in columns of the type commonly used in chemical engineering to carry out operations of this type; however, other devices may be used, for example, those operated with mechanical stirring.

The admixing of the gas phase discharged from the absorption zone with a liquid fraction taken from the solvent phase may be effected by mere line-mixing, by passage through a static mixer, in a mechanically stirred vessel or in a contact zone of the plate or packing type. The mixing of the liquid and vapor fractions and the heat supply by at least partial condensation of the resultant liquid/vapor mixture may be performed either successively, the mixing zone being distinct from the exchanger supplying heat to the environment, or simultaneously, for example, by performing this admixing step in a vessel equipped with a cooling exchanger.

Figure 2:
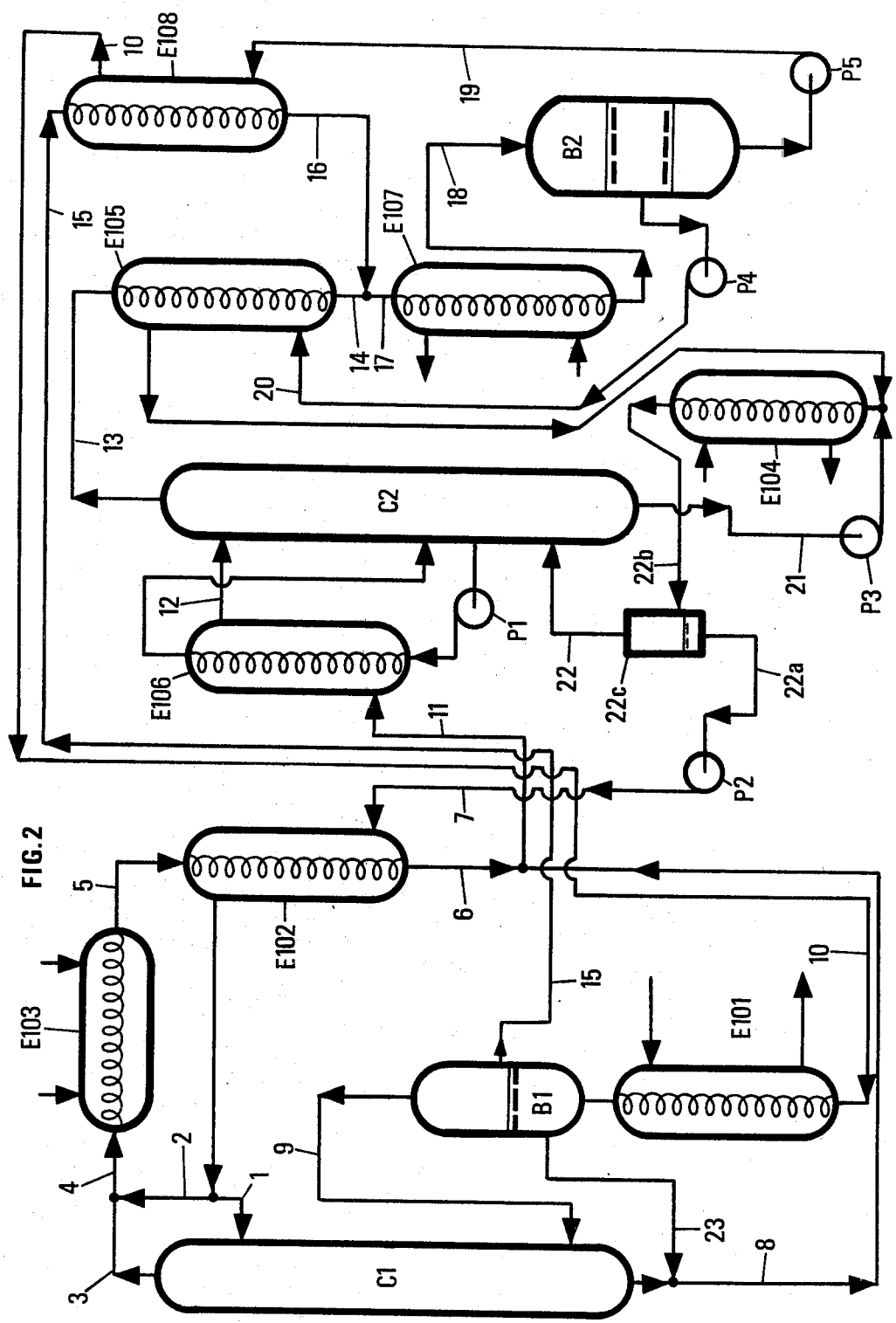
FIG. 2 is a schematic diagram of a heat converting system according to one embodiment of the present invention wherein a third fluid receives heat from two other fluids.

Embodiments of the invention are illustrated in FIGS. 1C, 2 and 3. Examples 1 and 2 illustrate the invention. For sake of simplicity, FIGS. 2 and 3 are described in relation to examples 1 and 2; however they have a wider scope which must not be interpreted as limited to the specific values given in said examples.

EXAMPLE 1

This example is illustrated by FIG. 2. It concerns a device operated according to the principle disclosed in French Patent 2.321.098 and modified according to the technique of the present invention. The desorption is effected in the 13-plate column of desorber C2. 11,360 Kmoles/h of an aqueous ammonia solution containing 24.5% ammonia by mole are fed through duct 12. This solution is desorbed in the presence of a stream of normal pentane vapor. The vapor is fed through duct 22 at a rate of 1913 Kmoles/h and its composition is as follows in molar fractions:

|  |  |
|---|---|
| $NH_3$ | 36.2% |
| $H_2O$ | 14.8% |
| $nC_5$ | 49.0% |

The pressure at the top of the column is 7.8 atm.

10,544 Kmoles/h of solution are discharged from the bottom of the column, through duct 21, by means of pump P3; this solution is vaporized in exchanger E 104, in the presence of a hydrocarbon, while receiving $16.1 \times 10^6$ Kcal/h from an external fluid which enters at 100° C. into exchanger E 104 and is discharged therefrom at 95° C. (fluid B of the general definition).

Before entering the column or desorber C2, the ammonia solution is cooled in exchanger E 106 from 97° C. to 81° C. Corresponding heat is transmitted to a recirculation stream which is withdrawn by means of pump P1 from below the 7th plate from the top and heats column C2.

A vapor stream of 2730 Kmoles/h is discharged through duct 13 from the top of column C2; its composition in molar fractions is:

|  |  |
|---|---|
| $NH_3$ | 59.7% |
| $H_2O$ | 6.0% |
| $nC_5$ | 34.3% |

This vapor stream is discharged at a temperature of 71° C. It is fed to exchanger E 105 where it is cooled by heat exchange with 937 Kmoles/h of liquid pentane (line 20) withdrawn from drum B2 by means of pump P4. At the outlet from exchanger E 105 (line 14), the temperature is 59° C. The liquid/vapor stream discharged through duct 14 is admixed with 9568 Kmoles/h of solution in liquid phase withdrawn from drum B1 and conveyed through lines 15 and 16. The resultant liquid-vapor mixture (line 17) fully condenses while releasing condensation heat in counter-current exchanger or first condenser E 107. In this exchanger, the mixture is cooled by means of 1915 m³/h of water fed at 20° C. and discharged at 30° C. At the outlet from exchanger or first condenser E 107 (line 18) the mixture is at a temperature of 30° C. A hydrocarbon phase is collected in drum B2; it is fed to exchanger E 104 through pump P4 after passage through exchanger E 105. An ammonia solution is also collected in drum B2; it contains 44.8% ammonia in molar fraction and is pumped through pump P5. This solution is fed through line 19 to the exchanger E 108 where it reheats by heat exchange with the solution fed from duct 15; it is discharged at a temperature of 45° C. At the outlet from exchanger E 108, the solution is fed, through duct 10, to the exchanger or evaporator E 101 where it partially vaporizes with recovery of $13 \times 10^6$ Kcal/h. The solution is fed to exchanger or evaporator E 101 at 68° C. and discharged at 90° C. The external fluid, which supplies heat to be upgraded, is fed at 100° C. and discharged at 95° C. (fluid C of the general definition). There is thus recovered a total of $29.1 \times 10^6$ Kcal/h. The liquid and vapor fractions, obtained at the outlet from exchanger or evaporator E 101, are collected in drum B1.

The unvaporized liquid fraction, at the outlet from exchanger E 104, is supplied through duct 22b to the separator 22c; it contains 12% of ammonia. It is fed through pump P2 and line 22a and then through line 7 to exchanger E 102, wherefrom it is discharged at a temperature of 101° C. The solution discharged from exchanger E 102 is made to 2 fractions. A first fraction or solvent phase, amounting to 3011 Kmoles/h, is fed to the adiabatic plate column or absorber C1 of 18 plates. It is operated at a pressure of 7.5 atm. In column or absorber C1, the liquid fraction fed from pipe 1 and the vapor fraction or solute vapor discharged from drum B1 through line 9 are contacted in counter-current. A liquid fraction containing 26.4% of ammonia is discharged from column or absorber C1 at a temperature of 102° C. This liquid fraction is admixed with the liquid fraction discharged from drum B1 to result in the absorption solution, conveyed through duct 23, and supplied to the column or absorber C2 through ducts 8, 11 and 12.

Vapor containing 74.5% ammonia is collected at the top of column or absorber C1. This vapor (line 3) is admixed with the second liquid fraction obtained by dividing the of solvent phase discharged from exchanger E 102 and which is used as additional supply. This liquid fraction is supplied from duct 2 and the resultant mixture is fed through duct 4 to the second condensor or exchanger E 103. At the inlet of the exchanger E 103 (line 4), the liquid mixture is at a temperature of 124° C. It is discharged at a temperature of 105° C. after having released $10 \times 10^6$ Kcal/h to an external fluid (fluid A according to the general definition). The mixture discharged from exchanger E 103 through line 5 is cooled from 105° to 95° C. in exchanger E 102, by heat exchange with the liquid fraction from duct 7. It is discharged through line 6.

This example clearly illustrates the advantage of dividing the liquid fraction from the desorption zone into two streams. It is thus possible to supply heat in a high temperature range, while feeding the absorption column with vapor at high feed rates, without recourse to thorough purification within the desorption zone, which results in a high yield.

EXAMPLE 2

This example is illustrated by FIG. 3. Desorption is conducted in a 13-plate column or desorber C4. 9068 Kmoles/h of a 21% molar aqueous solution of ammonia is fed through duct 24.

Column or desorber C4 is operated at a top pressure of 17.8 atm; the reboiler is operated at 180° C. and receives $14.455 \times 10^6$ Kcal/h. A 10% molar ammonia solution is discharged from the bottom of the column. A vapor fraction containing 79.2% ammonia is discharged from the top through duct 26 at a temperature of 147° C. This vapor fraction is admixed with the liquid phase supplied from duct 27 and the liquid-vapor mixture is fed through duct 28 to the exchanger or first condenser E 114. The mixture leaves exchanger or first condenser E 114 at a temperature of 90° C. in a fully condensed state. The condensation heat, i.e $9.501 \times 10^6$ Kcal/h, is used to heat water fed to exchanger or first condenser E 114 at a temperature of 70° C. and discharged therefrom at a temperature of 90° C. (fluid B of the general definition). The condensed solution is fed through duct 29 to exchanger E 115; it is discharged therefrom through duct 30 at a temperature of 75° C. It is then sub-cooled in exchanger E 116 and discharged therefrom at a temperature of 58° C. through duct 31. 910 Kmoles/h of solution is fed through duct 32 to the expansion valve V1. After expansion through valve V1, this solution is fed to exchanger E 116 where it vaporizes in such manner as to sub-cool the solution fed from duct 30. Resultant vapor is discharged from exchanger E 116 through duct 34. 3398 Kmoles/h of the solution sub-cooled in exchanger E 116 is fed through duct 33 to the expansion valve V2 where this solution is expanded to a pressure of 4.8 atm.

In exchanger or evaporator E 117, the resultant solution is partially vaporized, and the vaporization heat, amounting to $5.545 \times 10^6$ Kcal/h, is transmitted from water fed at 70° C. and discharged at 50° C. (fluid C of the general definition). The liquid-vapor mixture is fed through duct 35 to drum B4 where the liquid and vapor phases separate. The vapor phase is admixed with the vapor fraction fed from duct 34 and the resultant vapor phase or solute vapor, containing 95.9% ammonia and which amounts to 1066 Kmoles/h, is fed through duct 36 to column C3. The liquid phase contains 33.5% ammonia; 2555 Kmoles/h thereof are fed through pump P5 and duct 37 to exchanger E 115 and admixed with vapor discharged from column C4. The remainder of the liquid fraction is fed through duct 46 to drum B3.

The solution collected at the bottom of column or desorber C4 is fed through duct 25 to exchanger E 113, wherefrom it is discharged through duct 38 at a temperature of 170° C. Corresponding heat, i.e. $1.322 \times 10^6$ Kcal/h is transmitted to a re-circulation stream which is pumped off from below the 8th plate from the top, by means of pump P6; it is thus used for heating column or desorber C4. The solution discharged from exchanger E 113 through duct 38 is supplied to exchanger E 112 wherefrom it is discharged through duct 39 at a temperature of 110° C. The stream of duct 39 which is the solvent phase is divided into two fractions. A first fraction, amounting to 2596 Kmoles/h is fed through duct 40 to valve V4 for expansion; it is then fed to the plate column or absorber C3. The column or absorber C3 is adiabatic, comprises 13 plates and operates at a bottom pressure of 4.2 atm. The liquid fraction from valve V4 and the vapor fed from duct 36 are counter-currently contacted in that column. A vapor fraction containing 64.7% of ammonia is discharged at 111.3° C. from the top of the column C3, through duct 41; it amounts to 1071 Kmoles/h. The fraction of the stream fed from duct 39, which has not been supplied to column or absorber C3, amounts to 5019 Kmoles/h. It is fed through duct 42 to valve V3, where it expands, and is admixed with the vapor from duct 41. The resultant liquid-vapor mixture is fed through duct 43 to exchanger or second condensor E 109 at 112° C. and is discharged therefrom at 90° C. in fully condensed state. The condensation heat, amounting to $10.499 \times 10^6$ Kcal/h, is transmitted to water fed at 70° C. and discharged at 90° C. (fluid A of the general definition). The condensed mixture (line 44) is collected in drum B5 wherefrom it is pumped through pump P8 to be fed to drum B3.

From the bottom of column C3, there is recovered through duct 45 a liquid fraction or absorption solution containing 22.7% of ammonia at a temperature of 87.2° C.; it amounts to 2590 Kmoles/h. The mixture of the liquid fractions obtained in drum B3 is fed through pump P7 to the exchanger E 112 and then recycled to the column or desorber C4.

Examples 1 and 2 disclose each a particular embodiment of the invention. In example 1, which concerns the case No. 2, the desorption is performed in the presence of a hydrocarbon vapor phase which is condensed and recycled as disclosed in the French Patent No. 2,321,098. However these modes of desorption are indicated only by way of example; other arrangements conforming to the rules of the art may be used, the improvement according to the invention concerning specifically the manner of conducting the absorption.

What is claimed is:

1. In a process for operating an absorption heat conversion system of the type comprising an evaporator, a countercurrent absorber, a desorber, a first condenser, and a second condenser, all interconnected for providing the heat conversion, and heating means for supplying heat to the desorber and to the evaporator, receiving means for receiving heat from the first condenser and the second condenser, insulation means for limiting heat loss from the absorber to the exterior and for recovering at least a portion of the heat of the fluids discharged from the absorber, a solvent phase circuit including circulating means for circulating the solvent phase from the desorber to the absorber, a solute circuit including solute circulating means for circulating the solute phase from the desorber to the absorber through the first condenser and the evaporator, a circuit including solution circulation means for circulating absorption solution from the absorber to the desorber, solvent circulation means for circulating the solvent phase in countercurrent contact with the solute phase in the countercurrent absorber to thereby form a vapor phase and an absorption solution, temperature control means for maintaining a higher temperature at the discharge point for the vapor phase from the absorber than at the discharge point for the absorption solution, discharge means for separately discharging the vapor phase and the absorption solution from the countercurrent absorber, and a circuit including vapor phase circulating means for circulating the vapor phase discharged from the countercurrent absorber to the desorber through the second condenser, an improvement in said process comprising the steps of:

separating the solvent phase from the desorber into at least a first fraction ($L_1$) and a second fraction ($L_2$) prior to feeding into the absorber;

feeding only said first fraction ($L_1$) of the solvent phase into the absorber;

mixing said second fraction ($L_2$) of the solvent phase with the vapor phase discharged from the absorber to form a resultant mixture; and circulating said resultant mixture through the second condenser to the desorber.

2. A process according to claim 1, wherein the solute is ammonia and the solvent is water.

3. A process according to claim 2, further comprising the steps of circulating a hydrocarbon vapor phase through the desorber, discharging a mixture of said hydrocarbon vapor phase with said ammonia solute phase, condensing said mixture in said first condenser, separating a hydrocarbon liquid phase from an ammonia-water condensed phase and feeding said ammonia-water condensed phase to said evaporator.

4. A process according to claim 1, wherein the solute is a hydrocarbon and the solvent is an organic solvent.

5. A process according to claim 1, wherein the solute is a halogenated hydrocarbon and the solvent is an organic solvent.

6. A process according to claim 1, wherein the fraction ($L_2$) of the solvent phase amounts to 5 to 90% of the total solvent phase, the remainder constituting the solvent fraction ($L_1$) of the solvent phase.

7. A process according to claim 1, further comprising delivering the pressure in the absorption zone from 1 to 50 bars.

8. A process according to claim 1, further comprising delivering the heat evolved in the absorption zone in a temperature range between 20° and 150° C.

9. A process according to claim 1, further comprising the steps of effecting partial vaporization in said evaporator, thereby recovering an unvaporized liquid phase and a vaporized phase, separating said unvaporized liquid phase from said vaporized phase, feeding at least a fraction of said unvaporized liquid phase to the desorber and feeding the vaporized phase to the absorber as the solute phase.

10. A process according to claim 9 further comprising the step of feeding another fraction of said unvaporized liquid phase to the first condenser.

11. A process according to claim 1 further comprising the steps of contacting said first liquid fraction ($L_1$) in countercurrent and in substantially adiabatic conditions in the absorption zone thereby obtaining a solution S1 having an increased solute content and a gas phase having a decreased solute content, discharging said gas phase from the absorption zone, mixing said gas phase with said second liquid fraction ($L_2$) after being discharged to form said resultant mixture, and contacting said resultant mixture with an external fluid A for partially condensing said resulting mixture and increasing the heat content of said external fluid A.

12. A process according to claim 5 wherein the solute is a chlorinated hydrocarbon.

13. A process according to claim 5 wherein the solute is a fluorinated hydrocarbon.

14. An absorption heat conversion system comprising an evaporator, a countercurrent absorber, a desorber, a first condenser and a second condenser interconnected for providing heat conversion supply means for supplying heat to said desorber and to said evaporator, receiving means for receiving heat from said first condenser and said second condenser, limit means for reducing heat loss from said absorber to the exterior, thereby recovering at least part of absorption heat in the fluids discharged from said absorber, a first solvent phase circuit comprising solvent circulating means for circulating a first fraction ($L_1$) of said solvent phase from said desorber to said absorber, a solute circuit comprising solute circulating means for circulating the solute phase from said desorber to said absorber through said first condenser and said evaporator, a solution circuit comprising solution circulating means for circulating absorption solution from said absorber to said desorber, countercurrent circulating means for circulating said solvent phase in countercurrent contact with said solute phase in said countercurrent absorber, for thereby forming a vapor phase and an absorption solution, temperature control means for maintaining a higher temperature at the discharge point of the vapor phase from said absorber than at the discharge point for said absorption solution, discharge means for separately discharging said vapor phase and said absorption solution from said countercurrent absorber, a vapor phase circuit comprising vapor phase circulating means for circulating said vapor phase discharged from said countercurrent absorber to said desorber through said second condenser and a second solvent phase circuit comprising solvent circulating means for circulating a second fraction ($L_2$) of said solvent phase from said desorber to said second condenser for mixing with said vapor phase discharged from said absorber for creating a resultant mixture prior to passage thereof through said second condenser to said desorber.

* * * * *